United States Patent [19]

Rosenblad

[11] 4,222,405
[45] Sep. 16, 1980

[54] PRESSURE VACUUM BREAKER

[75] Inventor: Axel E. Rosenblad, Highlands, N.J.

[73] Assignee: Rosenblad Corporation, Princeton, N.J.

[21] Appl. No.: 923,775

[22] Filed: Jul. 12, 1978

[51] Int. Cl.³ .............................................. E03C 1/10
[52] U.S. Cl. ............................ 137/216.1; 137/247.25; 137/253; 137/254
[58] Field of Search ............ 137/251, 253, 254, 216.1, 137/247.35, 247.25, 247.33

[56] References Cited

U.S. PATENT DOCUMENTS

| | | | |
|---|---|---|---|
| 693,763 | 2/1902 | Warner | 137/247.35 X |
| 1,016,372 | 2/1912 | Smith | 137/254 |
| 1,461,404 | 7/1923 | Roth | 137/254 X |
| 1,666,487 | 4/1928 | Clements | 137/254 X |
| 2,037,731 | 4/1936 | Mobley | 137/251 X |
| 2,264,107 | 11/1941 | Willard | 137/254 |
| 3,187,765 | 6/1965 | Frank | 137/253 |
| 3,237,637 | 3/1966 | Ainsworth | 137/251 |
| 3,933,168 | 1/1976 | Meyer | 137/253 |
| 4,045,346 | 8/1977 | Swaskey | 137/247.33 X |

Primary Examiner—Harold W. Weakley
Attorney, Agent, or Firm—Brooks, Haidt, Haffner & Delahunty

[57] ABSTRACT

Excess steam pressure is relieved by displacement of a column of water through a vertical conduit opening a path for escape of steam through a space normally occupied by the water which normally acts as a seal. Under reversed conditions, air enters when the water is moved out of its sealing location by vacuum. The pressure vacuum breaker disclosed replaces flapper valves commonly used for pressure relief in paper making applications and has no moving mechanical parts.

6 Claims, 7 Drawing Figures

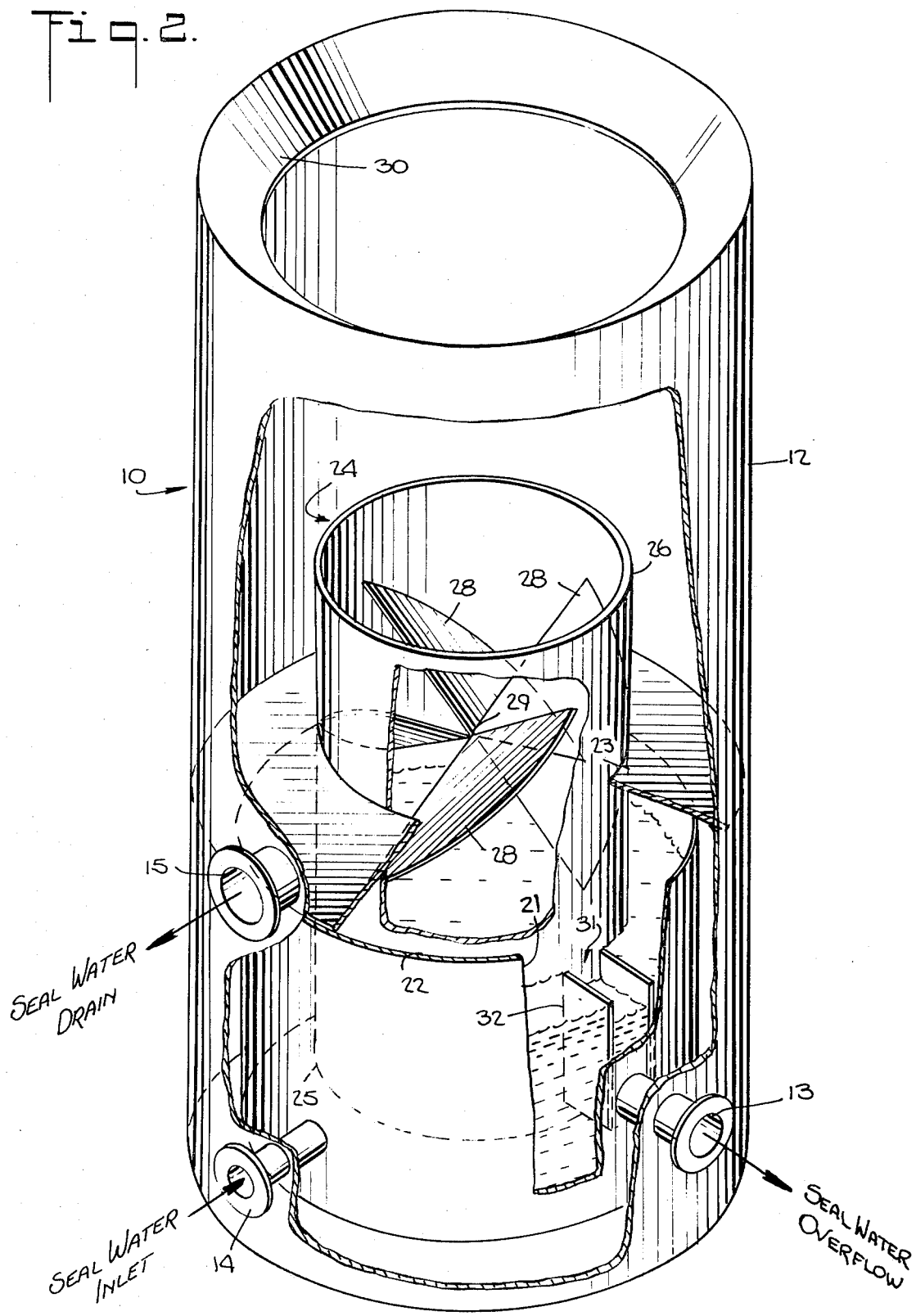

PRESSURE VACUUM BREAKER

BACKGROUND OF THE INVENTION

1. Field of the Invention

The invention relates to pressure relief and more particularly to a pressure relief device for high volume low pressure steam service.

2. Discussion of the Prior Art

In making cellulose pulp, large quantities of low pressure steam are generated when the contents of a digester under high pressure are flashed to atmospheric pressure in a blow tank. High energy costs and concern for pollution control make it necessary to condense all of this steam without allowing any to escape to the atmosphere. Generally, the vessels downstream of the digester are not pressure vessels and have to be protected by means of pressure relief valves. The type of valve most commonly used for pressure relief in such applications is a counter-balanced flapper valve, but leakage and the corrosion of mechanical linkages in such valves make them undependable and less than entirely satisfactory.

In a typical application, the pressure relief valve opens only two or three times a year, at the maximum. Normal operating pressures are 3 pounds per square inch gauge internal and 1 pound per square inch gauge external pressure and the steam flow can reach peak loads of 900,000 pounds of steam per hour. A highly dependable, leak proof valve is clearly desirable.

Although mechanical valves are used for pressure relief in pulp making, it should be noted that various kinds of water seals have been employed in relatively low steam volume applications in the past without really satisfactory results.

SUMMARY OF THE INVENTION

The present invention relates to a pressure vacuum breaker having no moving mechanical parts and primarily intended for use in connection with pulp digester operations to vent quantities of low pressure steam too great to be accomodated by condensers and the like located downstream of the digester.

In accordance with the invention, a well filled to a predetermined depth with water is interposed between a pressure vessel containing steam and a vertical conduit through which excess steam can only exit by pushing the water upward through the conduit. The distance through which the water must be moved for steam to escape is, of course, proportional to the steam pressure required before steam can exit and the conduit has a length above the normal water level in the well to prevent escape of steam below a predetermined pressure, such as, for example 3 psig.

Preferably stationary inclined vanes are provided in the vertical conduit to impart a swirling motion to water rushing upward through the conduit, forcing the water outward against an upstanding outer cylindrical wall of the pressure vacuum breaker unit to be captured in an annular chamber and returned to the well.

The pressure vacuum breaker unit also functions to admit ambient air when pressure in the vessel drops below a preset value, say about 1 psig below atmospheric pressure. In this mode of operation, the seal water in the well is sucked over a peripheral wall of the well, opening a path for entry of air through the vertical conduit into the system. The peripheral wall is ordinarily of a lesser height than the vertical conduit so the seal breaks under a smaller pressure differential in a low pressure upset than in high pressure upset conditions.

The pressure vacuum breaker of the invention can be mounted atop an accumulator tank in a pulp and paper mill. It will be appreciated that although the pressure relief device of the invention is described in connection with a pulp making application, the device has general utility in other industrial operations requiring pressure relief and safety devices, particularly applications involving large quantities of vapor or gas to be vented rapidly.

These and other structural and functional features and advantages of the invention will more fully appear in the following detailed description of a preferred embodiment of the invention, especially when that description is read in view of the accompanying drawings illustrating the presently preferred embodiment.

BRIEF DESCRIPTION OF THE DRAWINGS

In the drawings, in which like parts are identified by like reference characters throughout:

FIG. 2 is an overall view in perspective of the device of FIG. 1 with certain parts broken away to show internal structure;

DETAILED DESCRIPTION OF A PREFERRED EMBODIMENT

Figure 1:
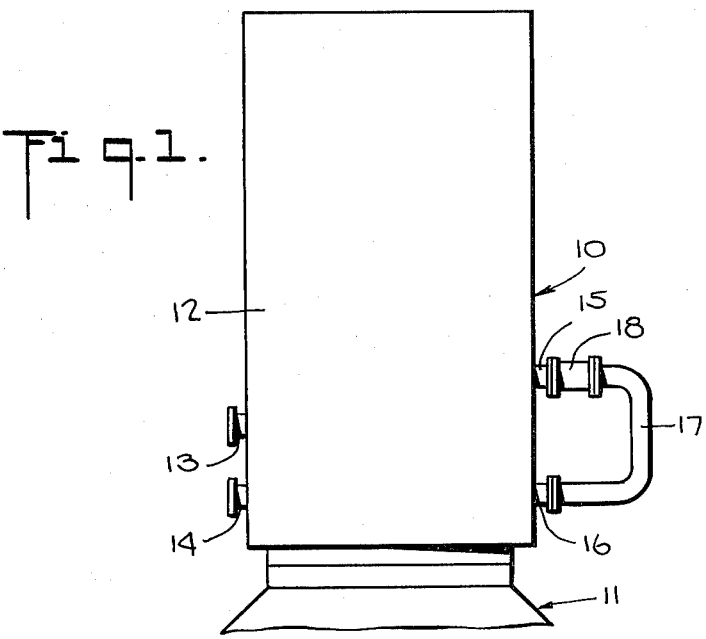
FIG. 1 is a side view of a pressure vacuum breaker according to the invention.

FIG. 1 shows the pressure vacuum breaker of the invention generally designated by reference numeral 10 mounted on a vessel 11, which could be an accumulator, from which steam must be allowed to escape when abnormal internal pressure develops in the vessel 11. The breaker device 10 has a generally cylindrical outer wall 12. An overflow outlet for seal water 13 and an inlet 14 are provided for maintaining a constant water level within the device 10 during normal operation. Also shown in FIG. 1 are a drain outlet 15 and return inlet 16 for high pressure upset conditions, connected by a piping loop 17 which can be provided with a check valve 18.

The piping loop 17 is omitted for clarity in FIG. 2. Also in FIG. 2, the several inlet and outlet locations are shown in a different radial relationship than in the other figures of the drawing, that is, these parts are moved so that they appear more clearly in the illustration of FIG. 2, and it will be understood that the angular relationship of these parts may be different in different applications from the positions shown in FIG. 1 where the parts 13 and 14 are diametrically opposite the parts 15 and 16 with respect to the cylindrical wall 12.

As shown in the drawings, a well 19 having a generally flat, disc shaped bottom 20 and an upstanding peripheral wall 21 is located within the lower part of the device 10, the wall 21 preferably being coaxial with the wall 12. The well 19 is supplied with water by means of inlet conduit 14 and the water level within the well 19 is maintained at a desired level during normal sealing operation by outflow of excess water through the overflow pipe 13, both pipes 13 and 14 passing through the outer wall 12 and communicating with the interior of the well 19 as schematically shown best in FIG. 5.

Figure 6:
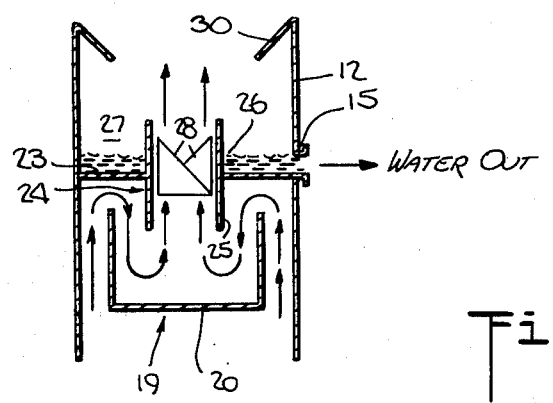
FIGS. 5, 6 and 7 are somewhat schematic illustrations of the device in vertical section showing respectively the normal condition of the device, and the conditions in the overpressure and vacuum modes of operation wherein arrows indicate the direction of steam and air flow.
Figure 5:
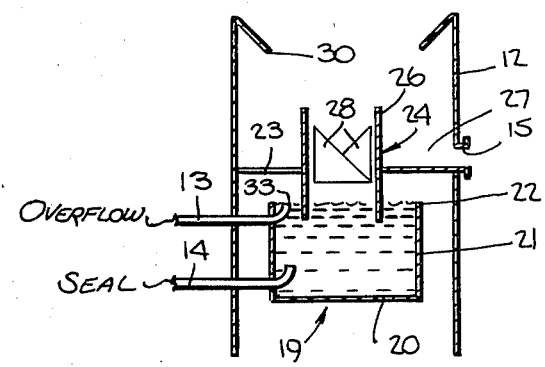
Figure 3:
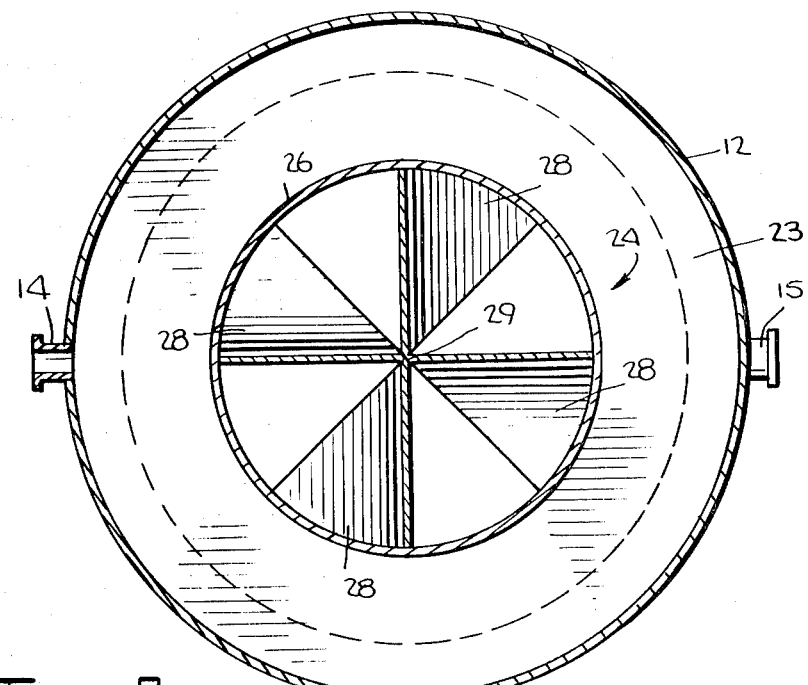
FIG. 3 is a view in section of the device of FIG. 1 looking downward to illustrate internal vanes.

The peripheral wall 21 of the well has its circular upper edge 22 spaced some distance below a horizontally arranged annular partition 23 so that water can flow freely over the edge 22. The partition 23 is secured at its circumference to the outer wall 12 of the device. A vertical conduit 24 extends through the central opening of the annular partition 23 and is sealingly secured thereto. A lower portion 25 of the conduit 24 extends downwards into the well 19 to a point below the normal level of water in the well 19 as shown in FIG. 5, and an upper part 26 of the conduit 24 extends above the partition 23, preferably about as far above the partition 23 as the lower part 25 extends below the partition 23. The conduit 24 provides a path by which water from the well 19 can be forced by internal overpressure to flow upward from the well 19 to a trough-like space 27 defined by the wall 12, the partition 23 and the upper conduit part 26 as shown in FIG. 6. Preferably the conduit 24 is cylindrical and coaxial with the walls 12 and 21. The outlet 15 allows water to exit from the trough space 27 when the valve 18 of FIG. 1 is open.

Centrally located within the conduit 24, and fixedly mounted thereon, are a plurality (four shown) of angled vanes 28 for imparting angular momentum to a stream of water passing upward through the conduit 24. The vanes 28 are secured together at a central point 29 located on the vertical centerline of the conduit 24 and have broad flat surfaces preventing direct upward passage of water through the conduit 24. The assembly of vanes 28 resembles a fan or propeller, but the vanes 28 do not move, rather the water stream is forced to rotate as it passes the vanes 28, causing water departing inwardly from the upper part 26 of the conduit to spread outwardly toward and against the wall 12 above the partition 23. Preferably there is an annular inturned and somewhat downwardly inclined internal lip 30 at the upper end of the wall 12 to prevent escape of the water distributed upwardly and outwardly by the conduit 24 and vanes 28.

Figure 4:
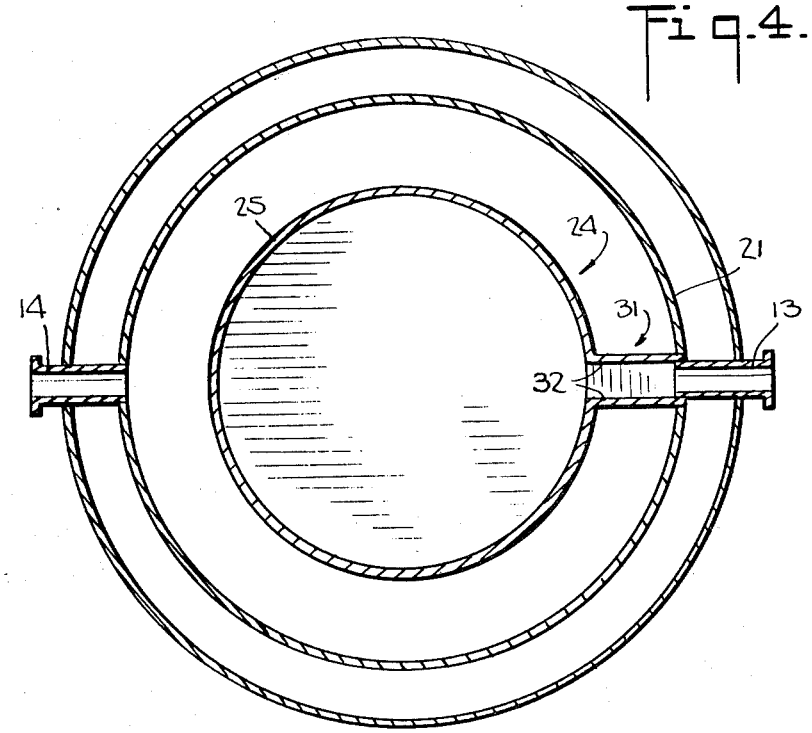
FIG. 4 is a sectional view of the device of FIG. 1 showing seal water overflow and inlet pipes.

A further feature of the presently preferred embodiment of the invention shown in FIGS. 2 and 4 is the provision of an upwardly open generally rectangular channel 31 with vertical side walls 32 leading from the sealing water well 19 to the overflow outlet 13 through which water can flow to the outlet 13 only when the water level in the well 19 is higher than the channel walls 32. This is an alternative to the overflow pipe construction shown in FIG. 5, wherein the overflow conduit has an upturned inlet portion 33 within the well 19.

The various structural parts of the device shown can generally be made of steel, and it will be understood that the device can be quite large. For example, to withstand an internal overpressure of 3 psig a pressure head of about 7 feet of water must be provided, requiring that the height of the conduit 24 above the normal water level in the well 19 must be at about 7 feet. Similarly to allow for an internal underpressure of 1 psig before water overflows the top 22 of well wall 21 to empty the well 19, the wall 21 must be somewhat over 2 feet in height. It will be understood that in view of the large quantity of water to be normally contained in the well 19, the device 10 must be of strong construction and that suitable water supply pumps etc. must be provided for refilling the well 19 after a low pressure upset.

Figure 7:
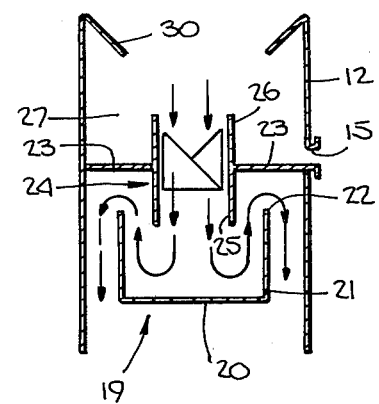

The operation of the device is shown schematically in FIGS. 5-7. In the normal operating condition of FIG. 5, water fills the well 19 to a selected level, kept constant by supplying water through pipe 14 as required. A build up of pressure in the protected vessel, such as an accumulator tank exerts pressure on the water surface outside the conduit 24, forcing water upward through the location of the vanes 28 to be collected in the trough space 27 as shown in FIG. 6, for return after the upset by way of outlet 15.

Low pressure (vacuum) upset conditions cause operation as illustrated in FIG. 7, wherein sealing water is sucked out of the well to allow entrance of ambient air in the direction shown by the arrows, the water either overflowing the wall 21 or the wall 32 or both during such a low pressure upset, after which the well 19 can be refilled to the normal level.

Those familiar with the art will understand that although the pressure vacuum breaker device of the invention has been described as applied in a pulp making system, there are other applications, particularly for industrial uses involving large volumes of gas or vapor which must be rapidly vented under extreme operating conditions. Various modifications, adaptations and uses of the device of the invention will suggest themselves to those acquainted with the art and are considered to be within the spirit and scope of the invention.

What is claimed is:

1. A pressure vacuum breaker comprising a well having a generally flat bottom and an upstanding generally cylindrical side wall for containing a quantity of liquid; liquid supply and overflow means communicating with said well to maintain a normal liquid level in the well; a generally cylindrical vertical conduit extending upward generally coaxially with said side wall from a level below the normal liquid level in the well to a height above said normal liquid level, a lower end of said conduit being spaced from said well bottom, said wall and conduit being housed within a generally cylindrical housing coaxial therewith and spaced from said well side wall; an annular partition plate surrounding said conduit above said well and extending between said conduit and said housing; and means for communicating to said well pressure in a vessel to be protected by the pressure vacuum breaker for displacing liquid from said well whenever such pressure exceeds pressure limits, whereupon gas or vapor can pass freely through said conduit, said pressure communicating means including an annular space between said housing and said side wall.

2. The device according to claim 1 and including means for imparting angular momentum to liquid passing through said conduit.

3. The device of claim 1 and including trough means provided above said partition for collecting liquid which has passed upwards through the conduit, and means for returning collected liquid to said well.

4. The device of claim 1 wherein said conduit contains means for imparting angular momentum to liquid passing therethrough and said housing includes means for capturing liquid that has passed upward through said conduit for return to said well.

5. The device of claim 7 wherein said angular momentum imparting means comprises a plurality of stationary inclined vanes.

6. The device of claim 1 wherein said annular partition plate is sealingly secured to said conduit and said housing above an upper edge of said well side wall for allowing liquid to overflow said well wall.

* * * * *